(12) United States Patent
Chen

(10) Patent No.: US 6,652,037 B2
(45) Date of Patent: Nov. 25, 2003

(54) HUB AND AXLE ASSEMBLY FOR A BICYCLE

(75) Inventor: Hubert Chen, Taichung Hsien (TW)

(73) Assignee: Kun Teng Industry Co., Ltd., Taichung Hsien (TW)

(*) Notice: Subject to any disclaimer, the term of this patent is extended or adjusted under 35 U.S.C. 154(b) by 0 days.

(21) Appl. No.: 10/039,888

(22) Filed: Jan. 3, 2002

(65) Prior Publication Data

US 2003/0094850 A1 May 22, 2003

(51) Int. Cl.[7] .......................... B60B 27/00; B60B 1/02; B60K 41/26
(52) U.S. Cl. ................... 301/110.5; 301/59; 301/110.6; 192/217.5
(58) Field of Search .................. 301/55, 59, 110.5, 301/110.6; 192/64, 217.5

(56) References Cited

U.S. PATENT DOCUMENTS

| | | | | |
|---|---|---|---|---|
| 2,211,548 A | * | 8/1940 | Schwinn | 192/217.5 |
| 5,129,711 A | * | 7/1992 | Chen | 301/110.5 |
| 5,494,337 A | * | 2/1996 | Behnke | 301/59 |
| 5,518,096 A | * | 5/1996 | Lin | 192/64 |
| 5,899,539 A | * | 5/1999 | Lin et al. | 301/110.5 |
| 5,950,784 A | * | 9/1999 | Yang | 192/64 |
| 5,997,104 A | * | 12/1999 | Campagnolo | 301/110.5 |
| 6,224,166 B1 | * | 5/2001 | Chen | 301/110.5 |
| 6,241,322 B1 | * | 6/2001 | Phillips | 301/124.2 |
| 6,402,257 B1 | * | 6/2002 | Chen | 301/110.5 |

* cited by examiner

Primary Examiner—S. Joseph Morano
Assistant Examiner—Jason R. Bellinger
(74) Attorney, Agent, or Firm—Pitney, Hardin Kipp & Szuch LLP

(57) ABSTRACT

A hub and axle assembly for a bicycle includes a hub shell rotatably mounted on an axle extending along an axis. A rolling member is interposed between and cooperates with a curved surrounding race portion of a mounting sleeve member secured on the axle and a curved surrounding race member to serve as an anti-friction bearing. A tubular mount member has a tubular engaging portion to engage a left wall segment of the hub shell, and a tubular mount portion extending outwardly of the hub shell to be driven by a uni-directional driving sprocket wheel mechanism. A retaining member is disposed to prevent the mounting sleeve member from moving away from the rolling member.

5 Claims, 4 Drawing Sheets

HUB AND AXLE ASSEMBLY FOR A BICYCLE

BACKGROUND OF THE INVENTION

1. Field of the Invention

This invention relates to a hub and axle assembly for a bicycle, more particularly to a hub and axle assembly which includes a bowl bearing mounted between the axle and a hub shell and which is adapted to be coupled to a uni-directional driving sprocket mechanism of the bicycle.

2. Description of the Related Art

Referring to FIG. 1, a conventional bicycle front hub 100 is shown to include a hub shell 1 with two ends, and an axle 2 extending through the two ends of the hub shell 1. Each end of the hub shell 1 is formed with an inner recess 101 so as to receive a bowl-shaped surrounding race member 301. The surrounding race member 301 has a bearing race surface for receiving a rolling member 302. A mounting sleeve member 303 is sleeved on the axle 2 and has a surrounding race portion 304 facing toward the surrounding race member 301 to cooperate with the surrounding race member 301 and the rolling member 302 to form an anti-friction bearing. A screw nut 4 is disposed to secure the mounting sleeve member 303 on the axle 2.

Since the surrounding race member 301 is generally made to have an outer diameter of 29.5 mm, the inner recess 101 in the hub shell 1 is required to have an inner diameter larger than 29.5 mm. Moreover, since a sprocket wheel mechanism of the bicycle is generally made to have an internal diameter of 30 mm, the hub shell 1 is required to have a threaded engaging portion with an outer diameter of 30 mm when the bicycle hub 100 is assembled on a rear part of the bicycle. However, it is difficult to make such a threaded engaging portion on the hub shell 1.

Referring to FIG. 2, another conventional bicycle hub 200 is shown to include a hub shell 5, and an axle 7 extending through two ends of the hub shell 5. One end of the hub shell 5 is formed with a threaded engaging portion 501 with an outer diameter of 30 mm for threadedly engaging a sprocket wheel mechanism (not shown) of the bicycle. A ball bearing unit 6, such as type 6804 of SKF which has an inner diameter of 15 mm and an outer diameter of 24 mm, is interposed between the hub shell 5 and the axle 7. However, this type of the bearing unit 6 is expensive and results in a relatively high manufacturing cost for the bicycle hub 200.

SUMMARY OF THE INVENTION

The object of the present invention is to provide a hub and axle assembly which is adapted to be coupled to a uni-directional driving sprocket wheel mechanism of a bicycle and which is economical to manufacture.

According to this invention, the hub and axle assembly includes an axle extending along an axis, and a hub shell which is rotatably mounted on the axle. The hub shell has left and right lateral ends disposed opposite to each other in an axial direction, and an inner peripheral wall extending in the axial direction to communicate the left and right lateral ends and spacedly surrounding the axle. The inner peripheral wall includes left and right wall segments disposed respectively proximate to the left and right lateral ends, and an intermediate wall segment interposed therebetween and defining a diameter smaller than that of the left wall segment so as to form a left surrounding shoulder that faces toward the left lateral end. A mounting sleeve member is sleeved on the axle, and has a surrounding race portion disposed proximate to and spaced apart from the left surrounding shoulder along an inclined line which forms an acute angle with the axis, and a surrounding abutment portion opposite to the surrounding race portion and proximate to the left lateral end. A surrounding race member has an attachment wall surface abutting against the left surrounding shoulder, and a race wall surface disposed opposite to the attachment wall surface along the inclined line and spaced apart from the surrounding race portion along the inclined line. A rolling member is interposed between and cooperates with the surrounding race portion and the race wall surface of the surrounding race member to serve as an anti-friction bearing between the mounting sleeve member and the left surrounding shoulder. The rolling member has a diameter co-linear with the inclined line. A tubular mount member includes a tubular engaging portion for engaging the left wall segment while being spaced apart from the surrounding abutment portion in radial directions, and a tubular mount portion which extends from the tubular engaging portion in the axial direction and outwardly of the left lateral end and which is adapted to be driven by a uni-directional driving sprocket wheel mechanism. A retaining member is secured to the axle to prevent the surrounding abutment portion from moving away from the rolling member.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 3:
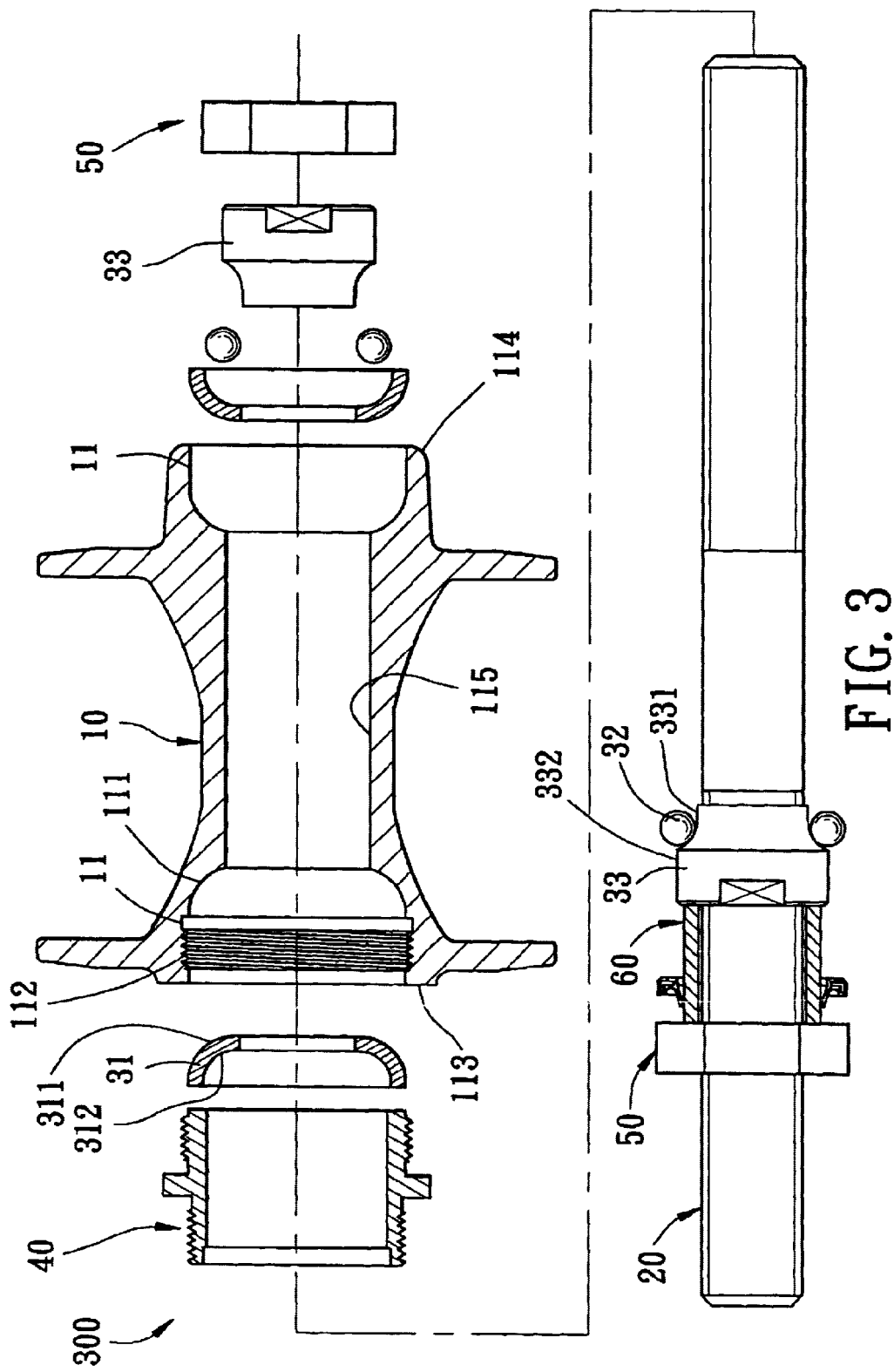
FIG. 3 is an exploded cross-sectional side view of a hub and axle assembly embodying this invention.
Figure 4:
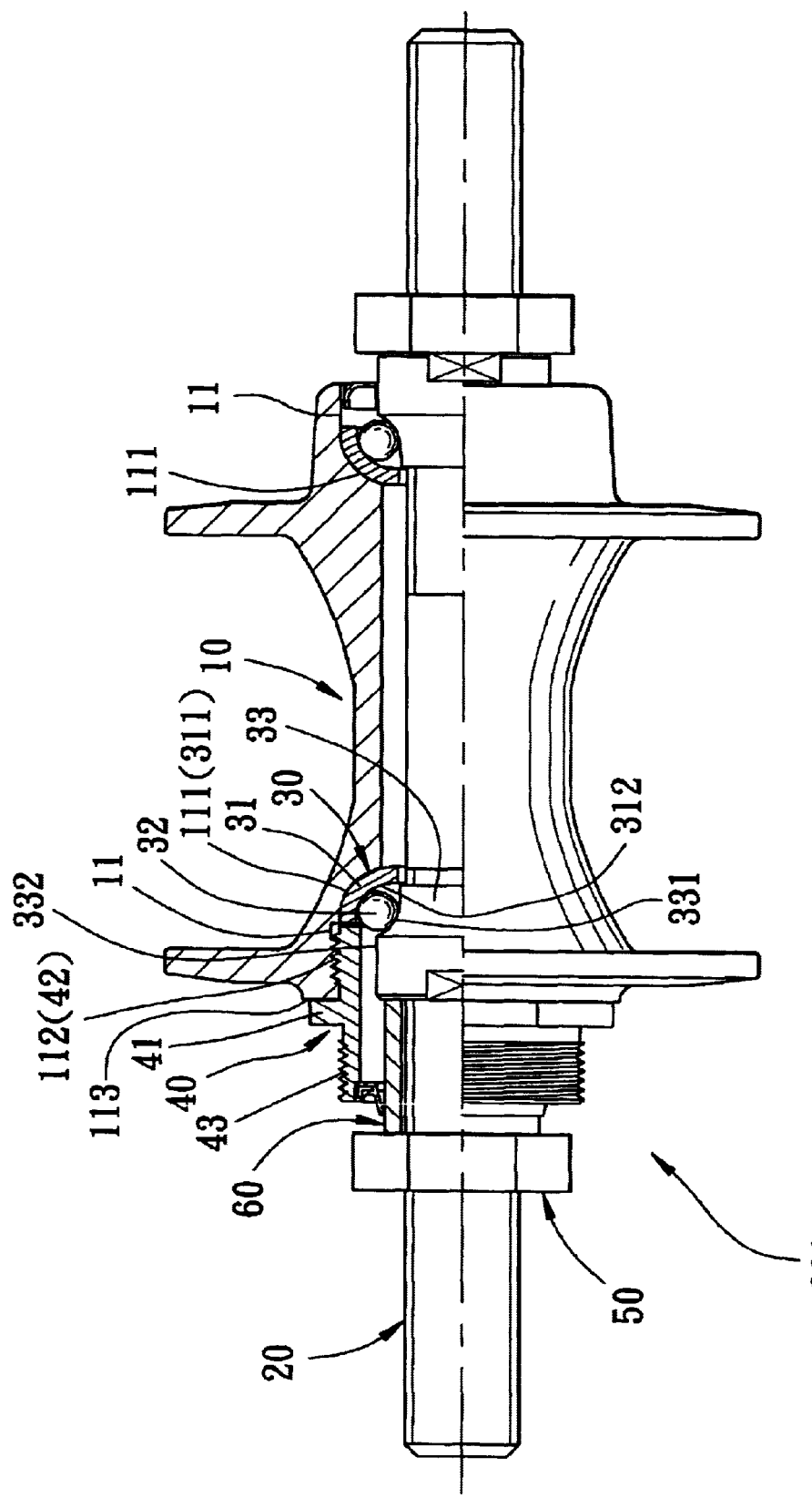
FIG. 4 is a partly cross-sectional side view of the hub and axle assembly of FIG. 3.

Referring to FIGS. 3 and 4, the preferred embodiment of the hub and axle assembly 300 according to the present invention is shown to comprise an axle 20 which extends along an axis, and a hub shell 10 which is rotatably mounted on the axle 20. The hub shell 10 has left and right lateral ends 113,114 which are disposed opposite to each other in an axial direction, and an inner peripheral wall which extends in the axial direction to communicate the left and right lateral ends 113,114 and which spacedly surrounds the axle 20. The inner peripheral wall includes left and right wall segments 11 which are disposed respectively proximate to the left and right lateral ends 113,114. Each of the left and right wall segments 11 defines a first diameter. The inner peripheral wall further includes an intermediate wall segment 115 which is interposed between the left and right wall segments 11 and which defines a second diameter smaller than the first diameter of the left and right wall segments 11 so as to form curved left and right surrounding shoulders 111 that face toward the left and right lateral ends 113,114, respectively. The left wall segment 11 is formed with internal threads 112 around the axial direction.

Left and right mounting sleeve members 33 are sleeved on the axle 20. Each of the left and right mounting sleeve members 33 has a curved surrounding race portion 331 which is disposed proximate to and which is spaced apart from a respective one of the left and right surrounding shoulders 111 along an inclined line that forms an acute angle with the axis of the axle 20, and a surrounding abutment portion 332 opposite to the surrounding race portion 331 and proximate to a respective one of the left and right lateral ends 113,114.

A surrounding race member 31 has an attachment wall surface 311 which abuts against a respective one of the left and right surrounding shoulders 111, and a race wall surface 312 which is disposed opposite to the attachment wall surface 311 along the inclined line and which is spaced apart from the surrounding race portion 331 of a respective one of the left and right mounting sleeve members 33 along the inclined line.

A rolling member 32 includes a plurality of balls which are interposed between and which cooperate with the surrounding race portion 331 of a respective one of the left and right mounting sleeve members 33 and the race wall surface 312 of the surrounding race member 31 to serve as an anti-friction bearing between the corresponding mounting sleeve member 33 and the corresponding surrounding shoulder 111. One of the balls has a diameter co-linear with the inclined line.

A tubular mount member 40 includes a tubular engaging portion 42 which is formed with external threads to engage threadedly the internal threads 112 of the left wall segment 11 while being spaced apart from the surrounding abutment portion 332 of the left mounting sleeve member 33 in radial directions, a tubular mount portion 43 which is disposed opposite to the tubular engaging portion 42 in the axial direction and which is formed with external threads thereon, and an annular flange portion 41 which is disposed between the tubular engaging portion 42 and the tubular mount portion 43. Thus, the tubular mount portion 43 extends outwardly of the hub shell 10 to have the annular flange portion 41 abut against the left lateral end 113. The external threads of the tubular mount portion 43 are adapted to engage threadedly and to be driven by a uni-directional driving sprocket wheel mechanism (not shown) of a bicycle.

A retaining member includes a tubular tightening member 60 which is sleeved on the axle 20 and which has one end that abuts against the surrounding abutment portion 332 of the left mounting sleeve member 33, and a screw nut 50 which engages threadedly the axle 20 and which abuts against the other end of the tubular tightening member 60 so as to tighten the left mounting sleeve member 33 on the axle 20 and to prevent the surrounding abutment portion 332 of the left mounting sleeve member 33 from moving away from the rolling member 32. Another screw nut 50 is disposed to engage threadedly the axle 20 to abut against and to tighten the right mounting sleeve member 33 in position on the axle 20.

Figure 1:
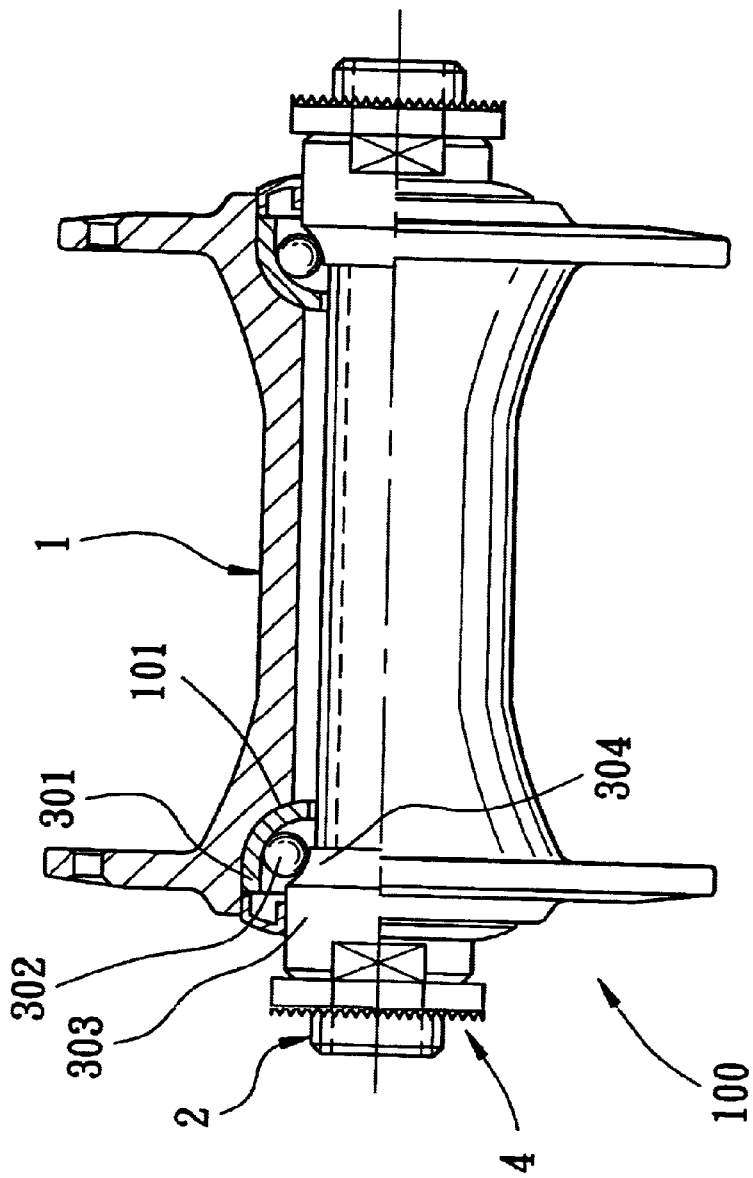
FIG. 1 is a partly cross-sectional side view of a conventional bicycle hub.
Figure 2:
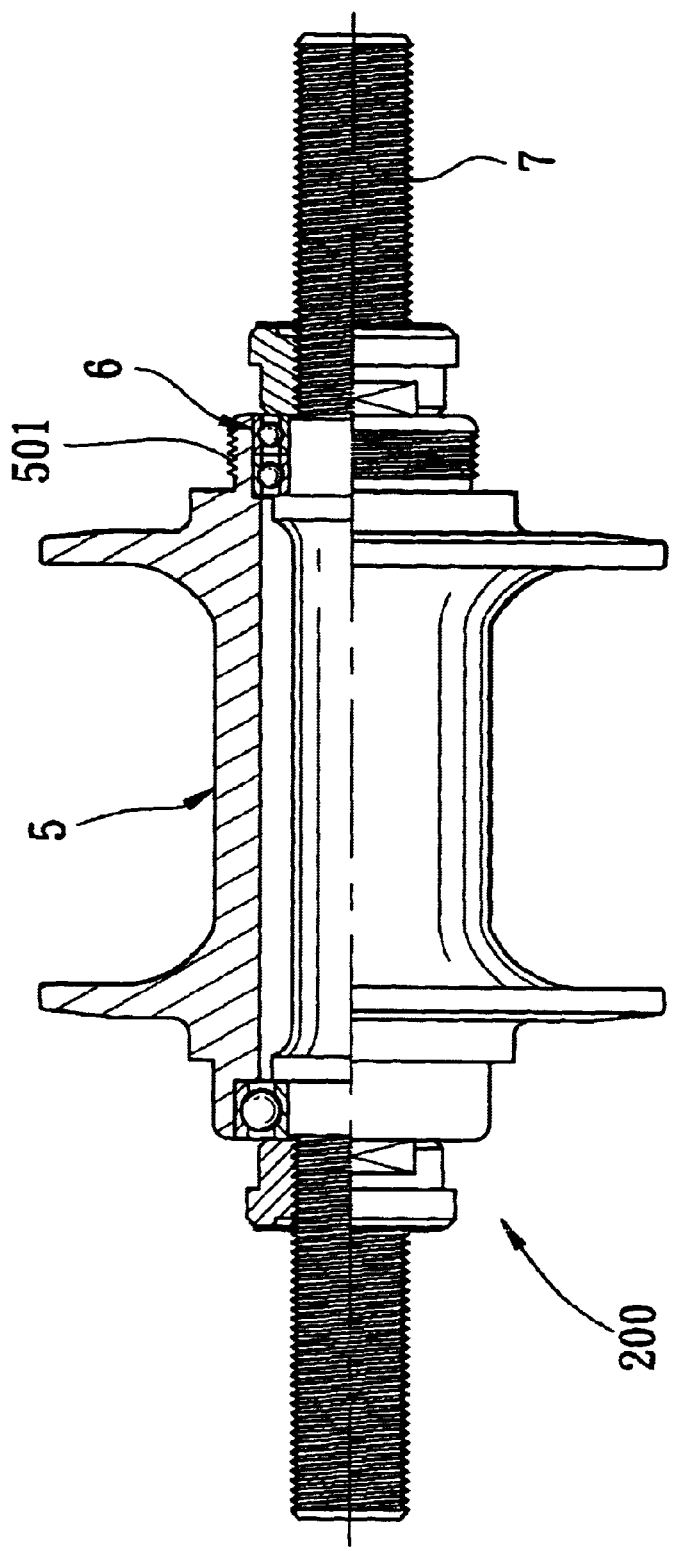
FIG. 2 is a partly cross-sectional side view of another conventional bicycle hub.

As illustrated, the left wall segment 11 can be configured to have the first diameter thereof larger than 29.5 mm such that the left surrounding shoulder ill has sufficient space to receive the surrounding race member 31 with an outer diameter of 29.5 mm. The tubular mount portion 43 can have an outer diameter of 30 mm so as to engage threadedly the sprocket wheel mechanism in a known manner. Instead of the conventional ball bearing unit shown in FIG. 2, the rolling member 32, the surrounding race member 31 and the mounting sleeve member 33 can serve as an anti-friction bearing. Moreover, due to the tubular mount member 40, the hub shell 10 can be easily coupled to the sprocket wheel mechanism.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A hub and axle assembly for a bicycle, comprising:
   an axle extending along an axis;
   a hub shell rotatably mounted on said axle, and having left and right lateral ends which are disposed opposite to each other in an axial direction, and an inner peripheral wall which extends in the axial direction to communicate with said left and right lateral ends and which spacedly surrounds said axle, said inner peripheral wall including left and right wall segments which are disposed respectively proximate to said left and right lateral ends, said left wall segment defining a first diameter, said inner peripheral wall further including an intermediate wall segment which is interposed between said left and right wall segments and which defines a second diameter smaller than said first diameter of said left wall segment so as to form a left surrounding shoulder that faces toward said left lateral end;
   a mounting sleeve member sleeved on said axle, and having a surrounding race portion disposed proximate to and spaced apart from said left surrounding shoulder along an inclined line which forms an acute angle with the axis, and a surrounding abutment portion opposite to said surrounding race portion and proximate to said left lateral end;
   a surrounding race member having an attachment wall surface abutting against said left surrounding shoulder, and a race wall surface disposed opposite to said attachment wall surface along the inclined line and spaced apart from said surrounding race portion along the inclined line;
   a rolling member interposed between and cooperating with said surrounding race portion and said race wall surface of said surrounding race member to serve as an anti-friction bearing between said mounting sleeve member and said left surrounding shoulder, said rolling member having a diameter co-linear with the inclined line;
   a tubular mount member including a tubular engaging portion configured to engage said left wall segment while being spaced apart from said surrounding abutment portion in radial directions, and a tubular mount portion which extends from said tubular engaging portion in the axial direction and outwardly of said left lateral end and which is adapted to be driven by a uni-directional driving sprocket wheel mechanism; and
   a retaining member secured to said axle, and configured to prevent said surrounding abutment portion from moving away from said rolling member.

2. The assembly of claim 1, wherein said surrounding race member is curved in cross-section.

3. The assembly of claim 1, wherein said left wall segment and said tubular engaging portion are formed with internal and external threads which extend in the axial direction and which are capable of engaging threadedly each other.

4. The assembly of claim 1, wherein said tubular mount portion is formed with external threads which extend in the axial direction and which are adapted to engage threadedly the uni-directional driving sprocket wheel mechanism.

5. The assembly of claim 1, wherein said retaining member includes a screw nut threadedly engaging said axle outwardly of said left lateral end of said hub shell, and a tubular tightening member sleeved on said axle and having two ends which respectively abut against said surrounding abutment portion and said screw nut so as to tighten said surrounding abutment portion from moving in the axial direction and away from said rolling member.

* * * * *